(12) United States Patent
Wangemann et al.

(10) Patent No.: US 10,035,607 B2
(45) Date of Patent: Jul. 31, 2018

(54) ELECTRICAL DRIVE SYSTEM FOR AN AIRCRAFT AND OPERATING METHOD

(71) Applicants: Airbus Defence and Space GmbH, Taufkirchen (DE); Airbus Operations GmbH, Hamburg (DE)

(72) Inventors: Joerg Wangemann, Magdeburg (DE); Jens Schult, Stelle (DE)

(73) Assignees: Airbus Defence and Space GmbH (DE); Airbus Operations GmbH (DE)

( * ) Notice: Subject to any disclaimer, the term of this patent is extended or adjusted under 35 U.S.C. 154(b) by 0 days.

(21) Appl. No.: 15/441,650

(22) Filed: Feb. 24, 2017

(65) Prior Publication Data
US 2017/0253344 A1    Sep. 7, 2017

(30) Foreign Application Priority Data

Mar. 2, 2016  (EP) ................. 16 158 337.2

(51) Int. Cl.
*B64D 41/00*  (2006.01)
*B64D 27/24*  (2006.01)
*H02P 27/06*  (2006.01)

(52) U.S. Cl.
CPC ............ *B64D 41/00* (2013.01); *B64D 27/24* (2013.01); *H02P 27/06* (2013.01)

(58) Field of Classification Search
CPC ...................................... H02P 27/06
USPC ....................................... 318/440
See application file for complete search history.

(56) References Cited

U.S. PATENT DOCUMENTS

| 5,773,962 A | 6/1998 | Nor |
| 7,701,154 B2 | 4/2010 | Oesterreicher et al. |
| 8,866,348 B2 * | 10/2014 | Venhaus ................. H02M 7/49 307/151 |
| 2009/0140743 A1 * | 6/2009 | Ohnuki ............ G01R 19/16542 324/426 |
| 2009/0230899 A1 * | 9/2009 | Arimura ............. H02M 3/1582 |

(Continued)

FOREIGN PATENT DOCUMENTS

| DE | 10 2005 026779 A1 | 12/2006 |
| DE | 10 2010 001250 A1 | 7/2011 |

(Continued)

OTHER PUBLICATIONS

Search Report dated Aug. 1, 2016 (EP 16158337.2).

(Continued)

*Primary Examiner* — Kawing Chan
(74) *Attorney, Agent, or Firm* — Lerner, David, Littenberg, Krumholz & Mentlik, LLP

(57) ABSTRACT

An electrical drive system for an aircraft includes: at least one first and one second electrical direct voltage sources for supplying a direct voltage, and a first and a second electrical machine modules configured to convert electrical alternating voltage into mechanical movement and vice versa. The first and second modules are connected to a first and a second power inverters, respectively. The first and second inverters are connected in series and the first and the second direct voltage sources are connected in series to generate an overall direct voltage to which the inverters are connected. The power inverters each has one voltage measuring device for measuring the power inverter direct voltage present at the respective inverter and a power inverter control device for controlling the operation of the inverters in accordance with the power inverter direct voltage.

11 Claims, 6 Drawing Sheets

(56) References Cited

U.S. PATENT DOCUMENTS

| | | | |
|---|---|---|---|
| 2011/0298424 A1* | 12/2011 | Yamauchi | B60L 3/0046 320/118 |
| 2012/0119573 A1 | 5/2012 | Turudic | |
| 2013/0049650 A1 | 2/2013 | Kurfiss et al. | |
| 2013/0241445 A1* | 9/2013 | Tang | B60L 15/2036 318/52 |
| 2014/0002002 A1 | 1/2014 | Barza et al. | |
| 2014/0035531 A1* | 2/2014 | Garnier | B60L 11/1853 320/118 |
| 2014/0361613 A1* | 12/2014 | Huang | H02J 1/06 307/12 |
| 2016/0001674 A1 | 1/2016 | Mikulec et al. | |
| 2016/0006276 A1* | 1/2016 | Mikulec | H02J 1/16 307/19 |
| 2017/0070175 A1* | 3/2017 | Butzmann | B60L 11/1864 |

FOREIGN PATENT DOCUMENTS

| | | |
|---|---|---|
| DE | 10 2011 013884 A1 | 9/2012 |
| DE | 10 2013 102194 A1 | 9/2014 |
| DE | 10 2014 203553 A1 | 8/2015 |
| DE | 10 2014 203563 A1 | 8/2015 |
| DE | 10 2014 223224 A1 | 8/2015 |
| DE | 10 2014 212935 A1 | 1/2016 |
| EP | 1950879 A1 | 7/2008 |

OTHER PUBLICATIONS https://de.wikipedia.org/wiki/airbus_e-fan, version of Feb. 12, 2016.

José Rodriguez, Senior Member, IEEE, Jih-Sheng Lai, Senior Member, IEEE, and Fang Zheng Peng, Senior Member, IEEE; „Multilevel inverters: A Survey of Topologies, Controls, and Application., IEEE Transactions on Industrial Electronics, vol. 49, No. 4, Aug. 2002.

Anonymous et al: "Relais aktuell, gemeinsame Website der Deutschen Schaltrelaishersteller im ZVEI", Nov. 4, 2014 (Nov. 4, 2014), XP055469379, URL:http://www.schaltrelais.de/2014-elementarrelais-funktionale-sicherheit.htm.

\* cited by examiner

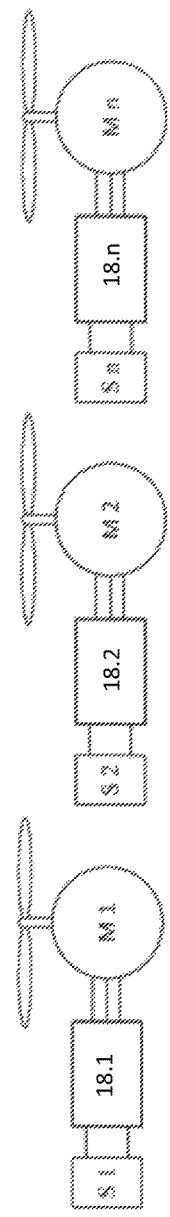
Fig. 3 – Prior Art
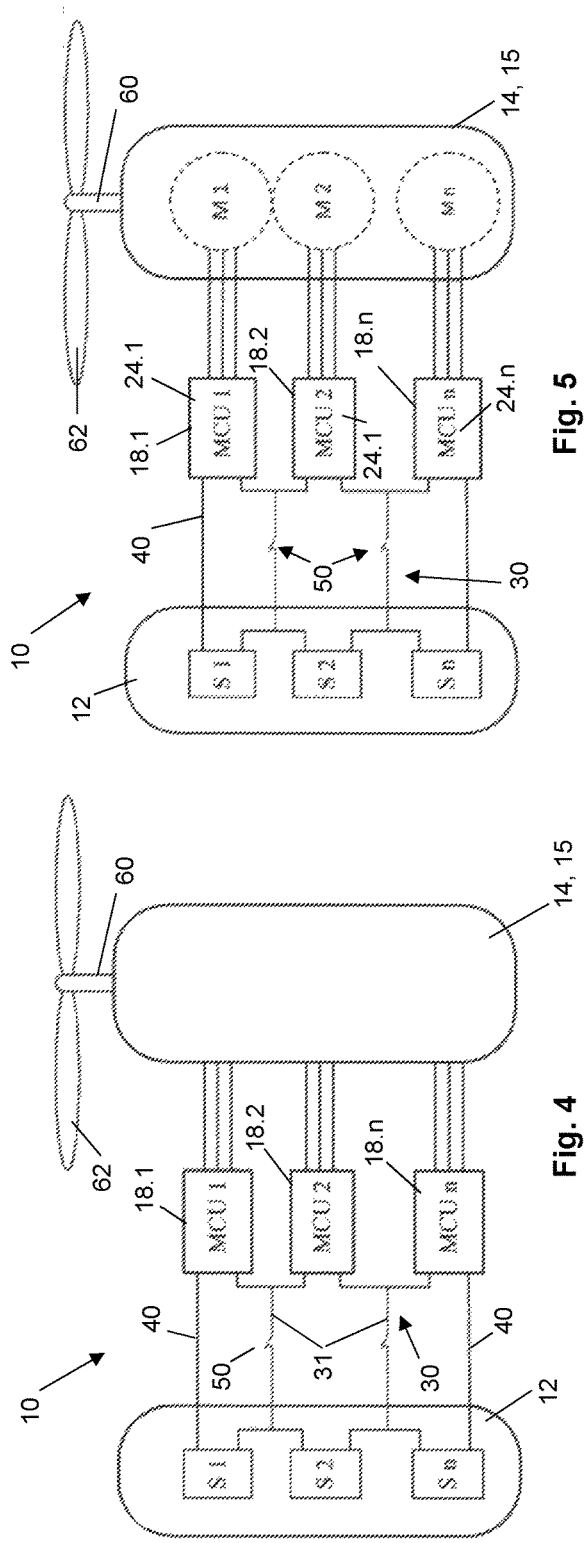
Fig. 4
Fig. 5

ELECTRICAL DRIVE SYSTEM FOR AN AIRCRAFT AND OPERATING METHOD

FIELD OF THE INVENTION

The invention relates to an electrical drive system for an aircraft. The invention further relates to an aircraft having such an electrical drive system and a method for operating such an electrical drive system.

BACKGROUND OF THE INVENTION

The testing of novel and alternative drive concepts for the propulsion or for ancillary components of aircraft is one subject matter of current research in the aviation sector. The propulsive drive system of the Airbus E-Fan is one example for an electrical drive system for aircraft; see https://de.wikipedia.org/wiki/airbus_e-fan, version of 12 Feb. 2016. The Airbus E-Fan is a two-seater electric aircraft by Airbus Group Innovations and serves for testing novel drive concepts. It is driven by two ducted propellers with a variable pitch that are respectively driven by electric motors. Lithium-ion batteries are accommodated in the wings for storing energy.

Efforts are being made to also use other electrical energy sources in addition to such batteries, such as solar cells and solar cell packs, photovoltaic modules, fuels cells or the like. Generally, electrical sources of energy of this type supply a direct voltage. For driving purposes, the direct voltage is frequently converted into alternating voltage in power inverters in order thus to drive electrical machines configured as alternating voltage machines—in particular alternating current motors.

Drives used in aircraft are frequently relevant with regard to safety. Therefore, most electrical drives in aircraft should therefore be designed in a redundant manner.

The current concept for achieving redundancy in electrical drive systems in aircraft is presented by way of example in FIG. 3. FIG. 3 shows several electric motors M1, M2, . . . , Mn for providing redundancy, each of which is supplied with electrical voltage by its own direct voltage source S1, S2, . . . , Sn via its own power inverter 18-1, 18-2, . . . , 18-n. Therefore, if there are, for example, three or four motors in order to provide drive redundancy, for example for a propulsion system, then, corresponding to the number of motors, the same number of transmissions for the propeller or the similar propulsion systems and the corresponding number of power electronic systems driving the respective motor are provided. This results in the need to accept a very large weight and also a cost disadvantage for providing the required redundancy as a safety buffer against the failure of a drive component.

With respect to the prior art, further reference is made to the following sources in literature:
[1] Jose Rodriguez, Senior Member, IEEE, Jih-Sheng Lai, Senior Member, IEEE, and Fang Zheng Peng, Senior Member, IEEE; "Multilevel inverters: A Survey of Topologies, Controls, and Application.", IEEE TRANSACTIONS ON INDUSTRIAL ELECTRONICS, Vol. 49, No. 4, August 2002.
[2] DE 10 2014 203 563 A1
[3] DE 10 2014 203 553 A1.

In these sources, different concepts for power electronic circuits for electrical drive systems are described in fields other than aircraft technology.

BRIEF SUMMARY OF THE INVENTION

An aspect of the invention relates to improving an electrical drive system for aircraft in such a way that an advantageous utilization of different sources of energy is made possible while improving the redundancy and, at the same time, saving weight and cost.

According to one aspect, the invention provides an electrical drive system for an aircraft, comprising: at least one first and one second electrical direct voltage source for supplying a direct voltage, a first electrical machine module and a second electrical machine module, the electrical machine modules being configured to convert electrical alternating voltage into mechanical movement and/or to convert mechanical movement into electrical alternating voltage, the first electrical machine module being connected to a first power inverter and the second electrical machine module being connected to a second power inverter, the first and second power inverters being connected in series and the first and the second direct voltage sources being connected in series in order to generate an overall direct voltage to which the series-connected power inverters are connected, the power inverters each having a voltage measuring device for measuring the power inverter direct voltage present at the respective power inverter and a power inverter control device for controlling the operation of the power inverter in accordance with the power inverter direct voltage, a compensating line being provided between a voltage source center tap between the first and second voltage sources and a power inverter center tap between the first and second power inverters, and the first and second power inverter control devices being connected to each other communicatively by means of a communication device in order to exchange at least one piece of information about the measured power inverter direct voltages in real time.

It is preferred that at least one of the power inverters has a power inverter current measuring device for measuring the power inverter direct voltage current flowing through the power inverter.

It is preferred that a piece of information about the measured power inverter direct voltage current can be transmitted in real time via the communication device.

It is preferred that the power inverter control device of the at least one power inverter is configured for controlling the operation of the at least one power inverter in accordance with the measured power inverter direct voltage current.

It is preferred that a compensating current measuring device for measuring the compensating current flowing through the compensating line is provided.

It is preferred that a piece of information about the measured compensating current can be transmitted via the communication device to at least one of the power inverter control devices.

It is preferred that at least one power inverter control device is configured for controlling the operation of the associated power inverter in accordance with the measured compensating current.

It is preferred that the first and/or the second power inverter is implemented in a machine control unit (MCU). The machine control unit can be implemented in, for example, a processor unit, for example as software. Alternatively, implementations in analog technology or as a simple logic (without software) may be provided. Thus, the communication lines may also be analog signal transmission paths for transmitting analog signals. The MCU preferably forms a single unit with the power output stage/power inverter (not shown) for controlling or driving the current through the machine phases. The power output stage is, for example, an inverter (semiconductor switches connected to form half-bridges), (A)NPC multilevel inverter, flying capacitor inverter, MMC converter or (Q-)Z source inverter.

It is preferred that that the first and second power inverter control devices are configured for compensating and/or adjusting the powers between the first and second direct voltage sources.

A preferred embodiment of the electrical drive system is characterized by at least one or several further direct voltage sources that are connected in series with the first and second direct voltage sources in order to generate the overall direct voltage.

A preferred embodiment of the electrical drive system is characterized by at least one or several further electrical machine modules with one further power inverter each, the further power inverter(s) being connected in series with the first and second power inverters and also having a further power inverter direct voltage measuring device and a further power inverter control device that are connected to the communication device.

It is preferred that the first and/or the second direct voltage source is provided with a voltage source switching device for switching off a terminal of the direct voltage source and with a bridging device for bridging the switched-off direct voltage source.

It is preferred that the compensating line is provided with a compensating line switching device with which the compensating line can be interrupted or connected.

It is preferred that the electrical machine modules are motor modules for driving a propulsion for an aircraft and/or for driving ancillary components of an aircraft.

It is preferred that the first and second direct voltage sources are selected from the group of direct voltage sources including a battery, a battery pack, a rechargeable battery, a rechargeable battery pack, a fuel cell, a fuel cell array, a solar cell, a solar cell pack and a solar panel.

According to another aspect, the invention provides an aircraft equipped with such an electrical drive system according to any one of the embodiments explained above.

According to another aspect, the invention provides a method for operating such an electrical drive system, wherein the power distribution between the first and second direct voltage sources is compensated and/or adjusted by means of the power inverter control devices.

In particular, the invention relates to the use of series-connected voltage source inverters for driving a modular drive system or a modular motor of an aircraft.

Particularly preferred embodiments of the invention have, in particular, one, several or all of the following advantages:
a) Voltage stresses, such as, for example, a corona discharge, du/dt, on the motor windings and motor bearings are reduced by reduced voltage levels—similar to multilevel inverters.
b) The electronic system is easily scalable to any voltage level higher than the nominal voltage of an inverter module. The inverter modules or power inverter modules are, in particular, implemented in microcontroller units (MCU). Due to the simple scalability, the provision of special inverter constructions for the different voltage levels is not required.
c) A modular power electronics concept can be provided, which results in a higher number, and thus reduced cost, of the individual electronic system modules that can be used for different motors with different voltages and outputs—provided the motor windings can be adapted in a suitable manner.
d) A modular electrical energy supply can be provided. This may include, for example, a battery, a fuel cell system or solar panels, and thus even general direct voltage sources whose power is not constant. Balancing or adjusting the powers between the individual sources can be carried out by the MCUs, which eliminates the requirement for a battery management system.
e) So far, the protection of high-voltage/high-power energy sources (such as, for example, batteries) against short circuits in the load—e.g. in an MCU—was difficult, because attractive and high-capacity power switches, which satisfied the requirements for aircraft, are still the subject matter of current research, and the currently available power switches are not yet optimally suited for current power electronic architectures. In the concept according to the invention, a single short circuit in one of the power inverter devices, given the proposed series connection of the power inverters, does not yet result in a short circuit of the electrical voltage supply—e.g. of a battery—which in some applications eliminates the requirement of such a protective circuit.
f) A higher redundancy level and/or a higher error tolerance level can be provided, both in the energy source as well as with regard to the electrical machines or the power inverters. In the case of failure of an energy source module, this energy source module can be bridged by adequate means in preferred embodiments, and the power inverters can continue to operate at a reduced voltage. In the case of a failure on the part of the electrical machine, such as, for example, the motor—e.g. a failure with an open voltage connection—open circuit—the electrical machine module can be bridged. In the case of a failure in the power inverter—e.g. a short circuit—it is possible to either install protective switches/fuses in the motor connections, or the motor is able to continue to operate with a partial short circuit, depending on the motor design (high or low inductive reactance).

The above-mentioned advantages a) to c) can be achieved, in particular, by a series connection of the power inverters. In the drive concept according to the invention, advantage d), in particular, can be achieved. Preferred embodiments with additional protective devices are possible in order to achieve the advantages e) and/or f).

According to an advantageous embodiment of the invention, scale effects are exploited by connecting together inverters and motor modules of the same kind.

One crucial point of the solution according to the invention is the application in aircraft and an increase in reliability. This is not provided in the literature sources [1] to [3].

According to advantageous embodiments, solar panels, fuel cells and/or inverters are provided as voltage sources.

Advantageously, fluctuations of individual voltage sources are compensated. Preferably, this takes place by balancing the powers of individual voltage sources. For example, it could come to pass, when using solar panels, that a solar panel is unilaterally shaded when flying a curve, so that it no longer outputs the same power as before.

In advantageous embodiments of the invention, a corresponding balancing is made possible.

Preferably, the maximization of the power still available is done by influencing an inverter modulation, and in particular by adapting impedance. In the solution described in [2] of the literature, the inverter topology shown there is unable to generate a voltage above the source voltage. Therefore, power maximization is not possible if the operating point of the drive requires a voltage above of the still-available voltage. With the technologies of the sources [2] to [3], the problem of a shaded solar panel, for example, can be addressed, at most, by a very disadvantageous system design.

In the sources [2] to [3], it is also provided that the neutral points of the motor modules are connected. From a standpoint of circuit engineering, this is a grave error because the inverters/power inverter provided there are connected in series and the rotary fields cannot be readily synchronized. Therefore, the sources [2] and [3] do not disclose a feasible solution.

As a sub-variation, the at least one center tap between the voltage sources and the inverters can also be opened or modulated for balancing the power in a preferred embodiment of the invention. This makes it possible to limit the current in a case of failure and, among other things, to decouple the failed components in the case of failure. The overall function is still available—even if with reduced power.

The sources [2] and [3] merely relate to several electrical machines that work on a common shaft; in contrast thereto, the solution described herein is also suitable for the operation of several separate drives.

BRIEF DESCRIPTION OF THE DRAWINGS

Exemplary embodiments of the invention will be explained below in more detail with reference to the attached drawing. In the drawings:

FIG. 3 shows an electrical drive system for aircraft in accordance with the prior art;

FIG. 4 shows a first example of application of the electrical drive system with a multiphase or modular motor for a propulsion of an aircraft;

FIG. 5 shows the same illustration as in FIG. 4 with a variant of the motor configured as a modular motor;

DETAILED DESCRIPTION

Figure 1:
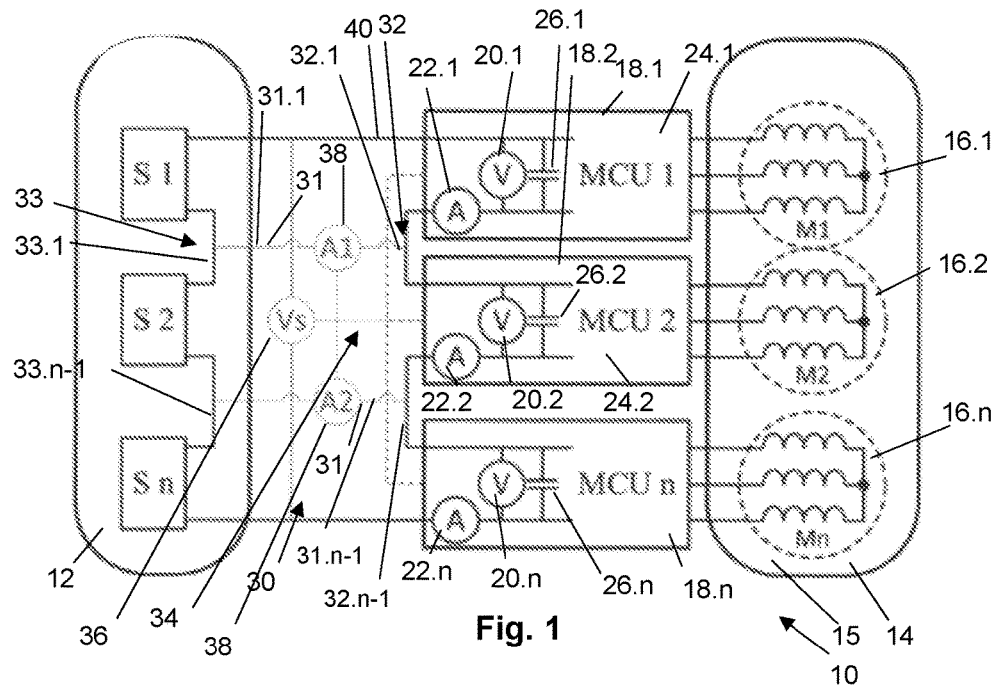
FIG. 1 shows a block diagram of an electrical drive system for an aircraft with series-connected power inverters and a compensating circuit.

FIG. 1 shows a schematic block diagram of a first embodiment of an electrical drive system 10 for an aircraft.

The drive system 10 has a modular energy source 12 and a modular motor 14.

The modular motor 14 is one example of a modular electrical machine 15.

The modular energy source 12 has several electrical direct voltage sources S1, S2, ..., Sn, wherein n≥2. The illustrated general block diagram shows a first direct voltage source S1 and a second direct voltage source S2 and another direct voltage source Sn.

The modular motor has several motor modules M1, M2, ..., Mn, wherein n≥2. The motor modules M1, M2, ..., Mn are examples of electrical machine module 16.1, 16.2, 16.n forming a module of the electrical machine 15 which, in a configuration as electrical motor modules or in a motor mode, are able to convert electrical energy into mechanical movement and, in a configuration as generator modules or in a generator mode, are able to convert mechanical movement into electrical energy.

The motor modules M1, ..., Mn or the electrical machine modules 16.1, ..., 16.n are configured as multiphase modules with m phases (m≥2) and are connected to the modular energy source 12 by associated electrical direct voltage sources S1, ..., Sn via a corresponding number of power inverters 18.1, 18.2, ..., 18.n that convert the direct voltage from the modular energy source 12 into alternating voltage (or, conversely, convert the alternating voltage from the electrical machine modules into direct voltage for the modular energy source 12 in a generator mode or generator operation).

At least one first power inverter 18.1 and one second power inverter 18.2 (if n=2) are provided. In other exemplary embodiments, at least one further power inverter 18.n (if n>2) is provided.

The power inverters 18.1, 18.2, 18.n are implemented in machine control units MCU1, MCU2, MCUn.

The power inverters 18.1, 18.2, 18.n each have a voltage measuring device 20.1, 20.2, 20.n for measuring the power inverter direct voltage V present at the respective power inverter 18.1, 18.2, 18.n, a power inverter current measuring device 22.1, 22.2, 22.n for measuring the power inverter direct voltage current A flowing through the respective power inverter 18.1, 18.2, 18.n, and a power inverter control device 24.1, 24.2, 24.n as well as associated capacitance members, such as a capacitor 26.1, 26.2, 26.n. The power inverter control device 24.1, 24.2, 24.n is implemented as software, for example, in the respective machine control unit MCU1, MCU2, MCUn.

According to the illustration in FIGS. 1, 2, 4 to 7, the power inverters 18.1, ..., 18.n are connected in series and connected to the terminals of the modular energy source 12.

As is also shown in these Figures, the direct voltage sources S1, ..., Sn of the modular energy source 12 are also connected in series in order thus to provide the overall direct voltage Vs of the modular energy source 12.

The direct voltage sources S1, ..., Sn can be configured similarly or differently. They can be batteries or rechargeable batteries, battery packs or rechargeable battery packs, fuel cells, photovoltaic devices or other devices for converting sunlight into electrical energy, in particular solar panels, solar cells or solar cell panels or any combination thereof.

Further, a compensating circuit 30 for compensating different powers of the electrical direct voltage sources S1, Sn is provided. The compensating circuit 30 has at least one compensating line 31, which, on the one hand, taps into a voltage source center tap 33 between two direct voltage sources S1, S2 or S2, Sn, and, on the other hand, into a power inverter center tap 32 between two power inverters 18.1, 18.2 or 18.2, 18.n.

Preferably, n−1 compensating lines 31.1, ..., 31.n−1 are provided that respectively connect the center taps 33.1, ..., 33.n−1 between successive direct voltage sources S1, S2, Sn with center taps 32.1, ..., 32.n−1 of corresponding successive power inverters 18.1, 18.2, 18.n.

Further, a communication device 34 is provided via which the power inverter control devices 24.1, 24.2, 24.n are communicatively connected in order to exchange at least the piece of information about the power inverter direct voltage V, which is present on the respective direct current terminal sources of the respective power inverters 18.1, 18.2, 18.$n$, from the associated direct voltage measuring devices 20.1, 20.2, 20.$n$.

Particularly preferably, further information about the overall direct voltage supplied at the modular energy source 12—measured by means of an overall direct voltage measuring device 36—and information about the currents A1, A2, ..., An−1 flowing via the individual compensating lines 31, 31.1, 31.$n$−1 is exchanged via the communication device 34. For this purpose, the center power inverter taps 32 have corresponding current measuring devices 38. The communication device 34 is configured for exchanging the voltage values and current values in real time.

The proposed electronic architecture, which is presented in a general form in FIG. 1, can also be applied to any type of electrical machine. The following is presumed in the illustrated exemplary embodiments.

Figure 6:
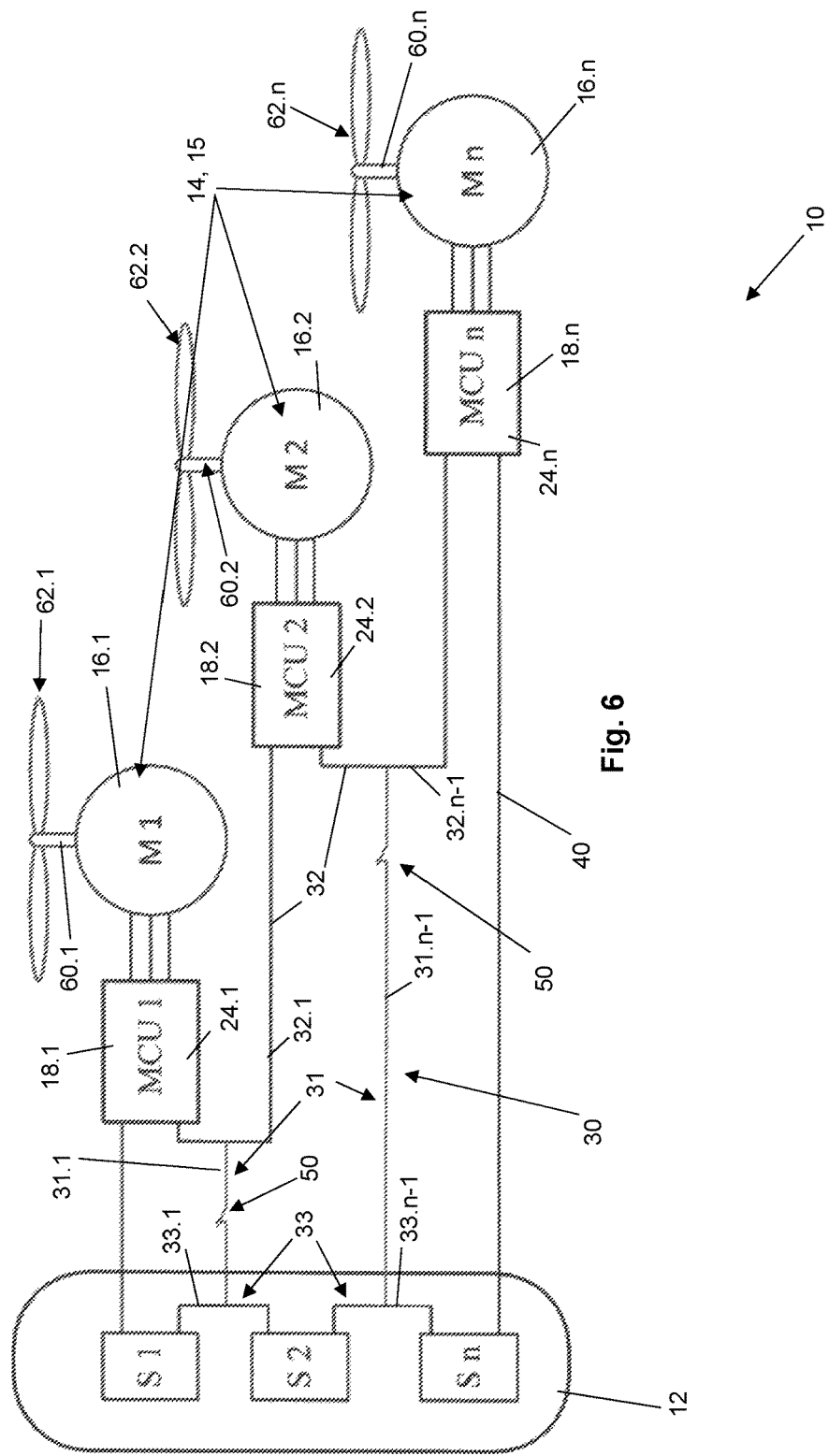
FIG. 6 shows another exemplary embodiment of the electrical drive system using engines without mechanical coupling.

Each machine module 16.1, ..., 16.$n$ is magnetically insulated from the other module or is exposed to only a small magnetic interaction with it. The electrical machine modules 16.1, ..., 16.$n$ can be mechanically coupled and thus be part of a modular electrical machine 15, such as part of the modular motor 14. For example, this is shown in FIGS. 1, 2, 4, 5, 7 and 9. However, such a mechanical coupling is not necessary for some applications. Such applications without a mechanical coupling are indicated in FIG. 6. Examples for mechanical loads without mechanical coupling include some fans in a distributed ventilation system or the electrical engines of a distributed electric aircraft propulsion system. Each motor module M1, M2, ..., Mn should be designed in accordance with the nominal voltage and the nominal current of the power inverter module 18.1, ..., 18.$n$. The motor modules M1, ..., Mn or, generally, the electrical motor modules 16.1, ..., 16.$n$ can be distributed in any way.

The power inverters 18.1, ..., 18.$n$ can be designed and/or implemented in accordance with different direct current-alternating current converter topologies. The power inverters 18.1 can be, for example, simple inverters, multi-level inverters or power inverter devices with the possibility of an impedance adjustment or impedance control using an additional amplifier stage, or also combined solutions as well as Z source inverters. The latter can be very useful particularly when the energy source 12 operates in a broad and in each case individual voltage range. This may be the case particularly in different solar panels that may be exposed to a different amount of sunlight irradiation. Thus, the remaining power can be maximized by amplifying the voltage to the desired value.

In particular, the power inverter control devices 24.1, ..., 24.$n$ can exchange information in real time through the communication device 34 and thus perform control tasks and, in particular, also tasks relating to the management of the modular energy source 12.

The manner in which the power inverter control devices 24.1, ..., 24.$n$ are possibly controlled by a central control unit not shown in more detail or by distributed control units (not shown) is apparent, in particular, from the following illustration of the mode of operation of the electrical drive system 10 shown in FIG. 1.

The block diagram of FIG. 1 shows the mode of operation and configurations that apply this proposed mode of operation.

The modular motor 14 is, for example, a multiphase motor composed of the individual motor modules M1, ..., Mn, wherein n≥2. Each motor module M1, ..., Mn has a multiphase configuration.

Each power inverter 18.1, ..., 18.$n$ acquires at least its own power inverter direct voltage V present across its direct voltage terminals. Current sensors—current measuring devices 38—for measuring the currents A, A1, A2 can be used for battery management applications.

The compensating lines 31.1, ..., 31.$n$−1 of the compensating circuit 30 serve for balancing/adjusting the power between the individual motors S1, ..., Sn of the modular energy source 12. The corresponding compensating lines 31.1, ..., 31.$n$−1 of the center taps 32.1, ..., 32.$n$−1; 33.1, ..., 33.$n$−1 have a nominal current designed for a maximum differential current, which is less than the nominal current through the supply lines 40 between the modular energy source 12 and the modular motor 14—at least in most applications.

The communication device 34 distributes at least some of the voltage states to some of the power inverter control devices 24.1, ..., 24.$n$ or between some of the power inverter control devices 24.1, ..., 24.$n$. This is done in real time.

As one option, passive voltage limiting devices (not shown), such as, for example, varistors, leakage resistors, suppressor diodes or the like, can be installed at every power input of the power inverters 18.1, ..., 18.$n$ in order to ensure that no overvoltage occurs at the power inverters 18.1, ..., 18.$n$—particularly if they are configured as MCUs—if they are passive or if the energy source is turned on.

Figure 2:
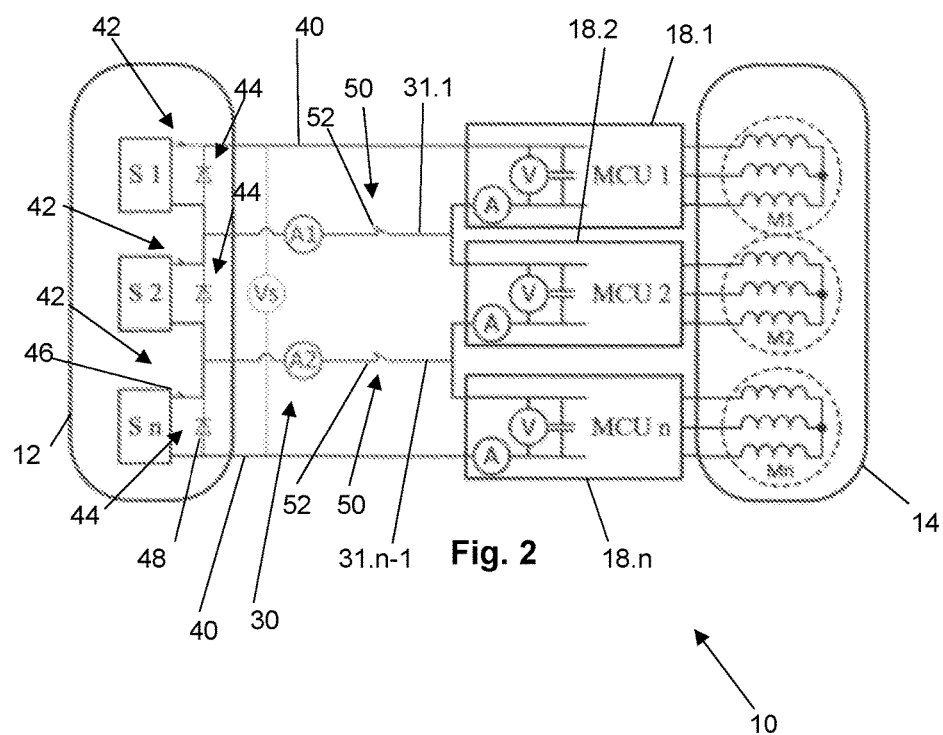
FIG. 2 shows another embodiment of the electrical drive system for aircraft with the series-connected power inverters, the compensating circuit and additional current interrupters or circuit breakers.

FIG. 2 shows another exemplary embodiment of the electrical drive system 10, which corresponds to the first exemplary embodiment according to FIG. 1 with the exception of the differences explained in more detail hereinafter. The same elements of the electrical drive system 10 are presented with the same reference numbers, and their description is not repeated.

In addition to the features presented above of the electrical drive system 10 according to the first embodiment in FIG. 1, at least one of the direct voltage sources S1, ..., Sn in the second embodiment has a voltage source switching device 42 for switching off a terminal of the direct voltage source or for separating the direct voltage source S1, ..., Sn as well as a bridging device 44 for bridging the direct voltage source. For example, a circuit breaker 46 is provided in the area of the direct voltage source. As an example of the bridging device 44, FIG. 2 shows a diode 48.

Another difference of the embodiment according to FIG. 2 to that according to FIG. 1 is that the at least one compensating line 31 can be provided with a compensating line switching device 50, with which the compensating line 31 can be switched through or interrupted. Also in this case, a switch, e.g. a semiconductor switch, protective switch or circuit breaker 52 may be provided.

The circuit breakers 46, 52 are preferably controllable by signal activation in order to automatically carry out, in the context of battery management, a switching process if certain conditions are met.

In particular embodiments, as shown, for example, in FIG. 2, the compensating circuit 30 is accordingly provided with additional switches or circuit breakers 52 in order to prevent a progress of a failure in the case of a short circuit in one of the power inverters 24.1, ..., 24.$n$. This is shown in FIG. 2 and in the examples of FIGS. 4 and 5. The circuit breakers 50 only have to be designed, as regards their nominal voltage, for the voltage of one of the voltage sources S1, ..., Sn or for the voltage of only one of the power inverters 24.1, ..., 24.n, and only for the maximum current that can flow through the associated compensating line 31, which allows for relatively simple and small circuit breakers 50. Thus, the use of solid-state switches or semiconductor switches is possible, which enables a modulation with a high frequency.

As indicated in FIG. 2, the energy source 12 may have one or more voltage source switching devices 42 with which a short circuit or a failure of at least one of the voltage sources S1, ..., Sn can be handled. Preferably, several or all of the voltage sources S1, ..., Sn are provided with such a voltage source switching device 42.

The diodes 48 indicated in FIG. 2 are an example of any kind of switching device for bypassing or bridging a voltage source module of the modular energy source 12. Accordingly, in a preferred embodiment of the modular energy source, at least one of the voltage sources S1-Sn is provided with a switching device for bypassing this voltage source S1, ..., Sn in case of a short circuit or of a failure of the same.

In the event of a failure of a voltage source S1, ... Sn that results in a short circuit, there are the following options:

No action is taken for rectifying the failure, and the current continues to flow through the voltage source or the bypass circuit (e.g. the diode 48).

The voltage source switching device 42 (e.g. the circuit breaker 46) is opened in order to insulate the failed S1, ..., Sn.

In one embodiment, both of the aforementioned cases would result in the associated power inverter module 18.1, ..., 18.n ceasing its operation. As one option, an associated compensating line switching device 50 can be opened in order to enable the associated power inverter module 18.1, ..., 18.n to continue its operation.

In other embodiments that are not shown, circuit breakers or fuses are provided between the associated power inverter 18.1, ..., 18.n and the associated electrical machine module 16.1, ..., 16.n. Such fuses or circuit breakers can be desirable for some motor technologies or motor designs. They are not required, for example, for asynchronous motors, (switched) reluctance motors or even for some permanent magnet motors in which the inductance of the motor phases is sufficient to limit the short-circuit current to a value below a critical value.

As was already indicated above, central or distributed control units (not shown) may be provided.

If, in one embodiment according to FIG. 2, one of the power inverters 18.1, ..., 18.n deteriorates into a short-circuit state, the compensating line switching devices 50 or circuit breakers 52 can be opened. In this case, one of several circuit breakers 52 or one of several compensating line switching devices 50 can be opened, or several of these compensating line switching devices 50 or circuit breakers 52 can be opened, too. In such a state, the adjustment of the power of the individual direct voltage sources S1, ... Sn is no longer possible. In such a case, the direct voltage terminal voltages of the respective power inverters 18.1, ..., 18.n should be controlled or regulated. Since the voltage values of at least the overall voltage Vs of the modular energy source 12 or the direct voltage terminal voltage (power inverter direct voltage V) of the individual power inverters 18.1, ..., 18.n are known, it is possible to use the motor current or the motor power in the machine control units MCU1, ..., MCUn or, more generally, in the power inverter control devices 24.1, ..., 24.n by applying suitable control methods or regulating methods, in order to keep the voltage values balanced or at desired values. Furthermore, it is possible to adjust the power between the power inverters 18.1, ..., 18.n or the electrical machine modules 16.1, ..., 16.n by regulating or controlling the direct voltage terminal voltage (power inverter direct voltage V) to the required value.

In the following, examples for the application of the electrical drive system 10 in or on aircraft are explained in more detail with reference to FIGS. 3 to 9.

FIG. 3 shows an electrical drive system in accordance with the prior art for a redundant drive, such as, for example, an aircraft propulsion system. Several separate motors M1, ..., Mn, each with their own power inverter 18.1, ..., 18.n and their own direct voltage source S1, ..., Sn, are provided.

FIG. 4 shows that the mechanical components of the propulsion system, such as, for example, propellers 62 or propeller transmissions, may be provided only once, for example, if the failure probability for such mechanical components is low. FIG. 4 shows a multiphase motor in which several phases are provided for redundancy, wherein each phase is provided with one of the power inverters 18.1-18.n in the configuration of the invention, and the modular energy source 12 is also connected in the configuration of the invention.

FIG. 5 shows a comparable embodiment in which several motor modules M1, ..., Mn work on a shaft 60 in order thus to form the modular motor 14 driving the propulsion system.

Accordingly, FIGS. 4 and 5 show an electrical drive system 10 with a multiphase motor and/or a modular motor 14, with machine control units MCU1, ..., MCUn for forming the power inverters 18.1, ..., 18.n, which are connected in series, the compensating circuit 30 and the modular energy source 12 with series-connected direct voltage sources S1, ..., Sn. The motor phases or motor modules M1, ..., Mn can be arranged in any way, with or without magnetic coupling. In the embodiments of FIGS. 4 and 5, the electrical machine modules 16.1, ..., 16.n are mechanically coupled, e.g. by means of a connection with the same shaft.

FIG. 5 shows another example of an application, wherein the motor modules M1, M2, Mn are configured as separate electrical machines that are supplied with energy by associated series-connected power inverters 18.1, ..., 18.n, wherein the compensating circuit 30—in this case with a compensating line switching device 50—and the modular energy source 12 are provided. The electrical machine modules 16.1, ..., 16.n can be configured to be fully separate—for example, as shown with their own shafts 60.1, ..., 60.n and their own propulsion device 62.1, ..., 62.n, such as a propeller 62, for example; they could also be mechanically coupled.

As indicated in FIG. 6, in addition to the series connection of several of the power inverters 18.1, 18.2, 18.n of the invention, some of the power inverters may also be connected in parallel. Here, two modular motors 14.1 and 14.2, each with several motor modules M.1.1, ..., M.1.n; M.2.1, ..., M.2.n, are provided, which are respectively supplied by machine control units MCU1.1, ..., MCU1.n; MCU2.1, ..., MCU2.n, wherein, in the illustrated exemplary embodiment, pairs of power inverters MCU1.1, MCU2.1, ..., MCU1.n, MCU2.n are respectively connected in parallel, by means of the compensating lines 31, to one corresponding direct voltage source S1, ..., Sn in each case. FIG. 6, for example, results from the embodiment FIG. 5 by another modular motor 14.2 being connected to the modular energy source with a corresponding circuit.

Figure 7:
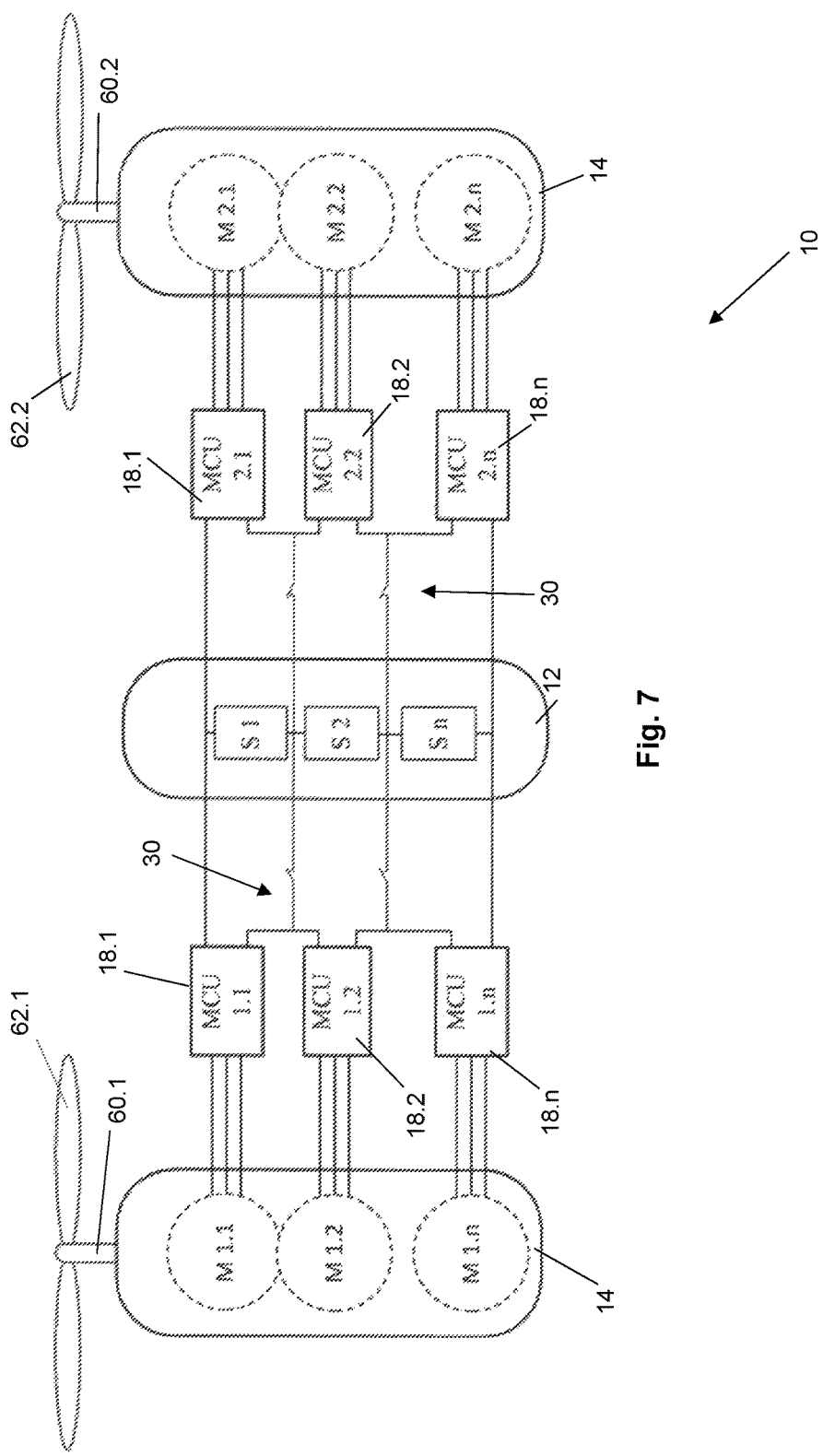
FIG. 7 is a block diagram of another exemplary embodiment of the electrical drive system with two modular electrical machines.

Thus, FIG. 7 shows a drive system 10 with two modular machines 14.1, 14.2, two n machine control units MCU1.1, ..., MCU1.n; MCU2.1, ..., MCU2.n in each case, in an electrical series and parallel connection, with a compensating circuit 30 and a modular energy source 12 in a series connection.

So far, the electrical drive system 10 has been described with reference to the example of an application for driving the propulsion of an aircraft 70. A specific practical example results from the application of the circuits described herein to the drive system of the Airbus E-Fan aircraft, as explained in the introduction.

Figure 8:
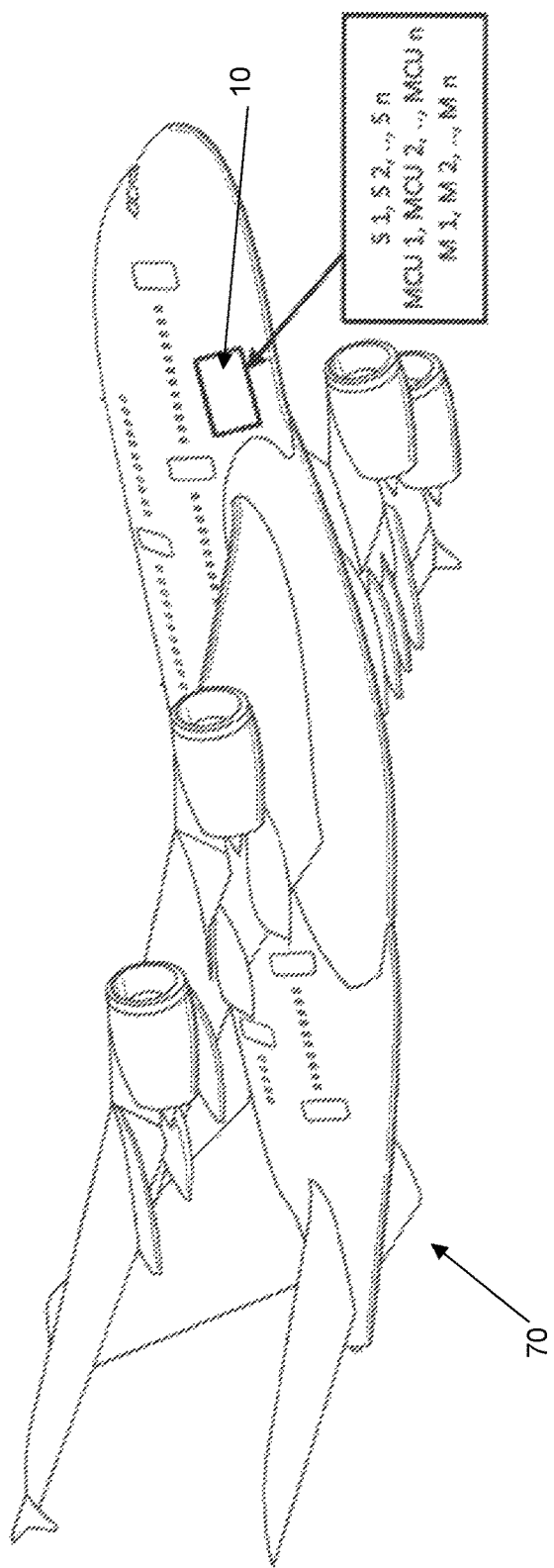
FIG. 8 is a perspective view of an aircraft with an example for an application of the electrical drive system for driving components of the aircraft, such as, for example air-conditioning systems or hydraulic pumps.

As indicated in FIG. 8, the drive system 10, however, may also be used for driving other components, e.g. air conditioners or hydraulic pumps, or of other—even safety-relevant—ancillary components in an aircraft 70. Accordingly, FIG. 8 shows an aircraft 70 with one or more of the electrical drive systems 10 proposed herein.

Figure 9:
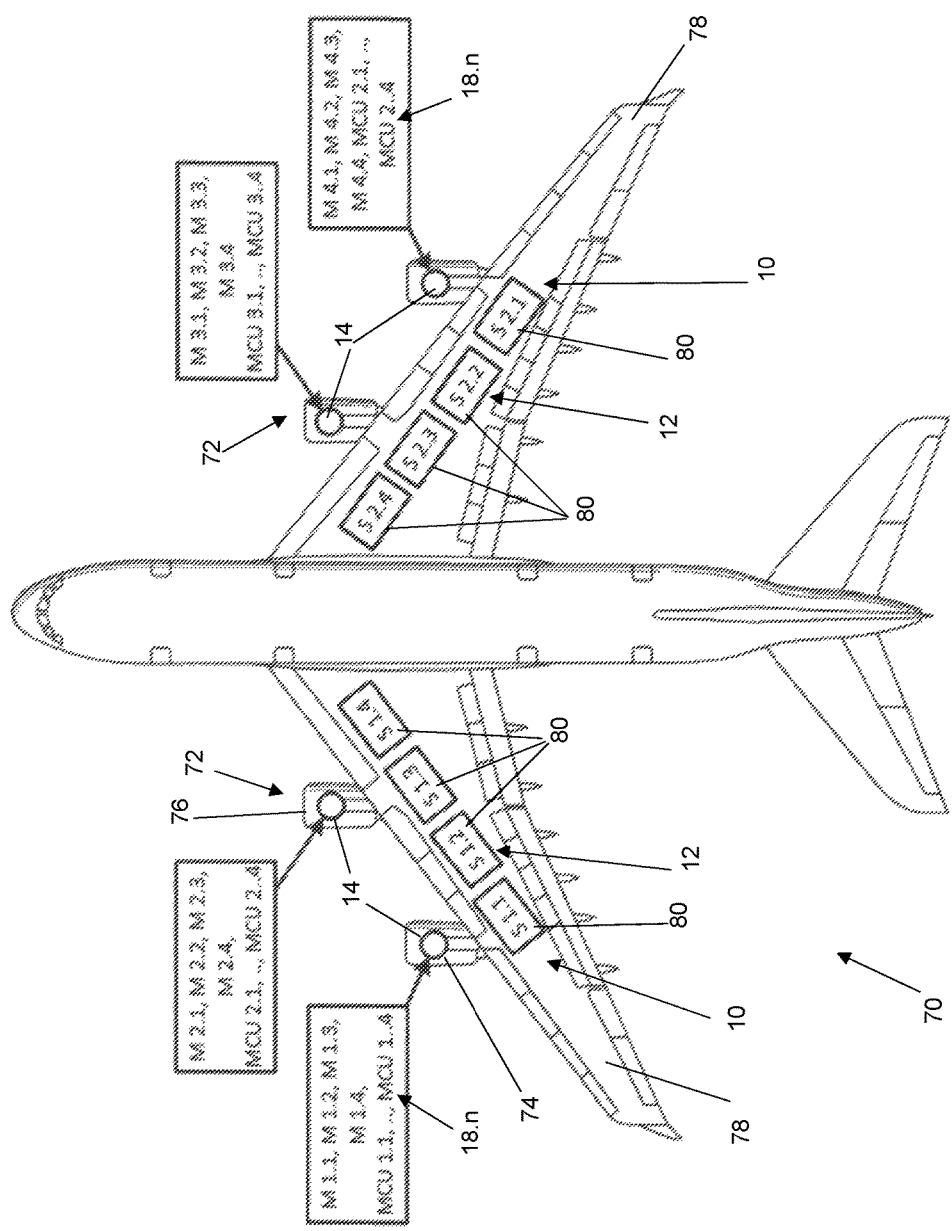
FIG. 9 is another exemplary use of the electrical drive system in an aircraft in the region of the engines, e.g. as an electrical propulsion system or as a starter and/or as a generator.

FIG. 9 shows an aircraft 70 with an electrical propulsion system 72 as another example of a use of the electrical drive system 10, or an aircraft 70 in which the starter 74 or generators are configured as the electrical drive system 10. Every engine 76 may contain one or more modular machines 15. Every voltage source module S1, ..., Sn can be connected to one or more of the power inverters 18.1, ..., 18.n. For example, a drive system 10 formed in one of the wings 78 may have the configuration shown in FIG. 7. In this case, there is one electrical drive system 10 with the configuration indicated in FIG. 7 on each of the wings 78. For example, a plurality of solar panels 80, which form individual ones of the direct voltage sources S1, ..., Sn, is provided on the wing 78. In the example of FIG. 9, n=4.

A new architecture for an electrical drive system 10 has been described above, with which the redundancy for applications in aircraft 70 can be reduced while reducing the weight and complexity. So far—as was depicted in FIG. 3—a system with three or four motors, for example, was provided for creating the redundancy. Since the intention is not to rely on only one of the motors, a corresponding number of transmissions, of propulsion devices, such as propellers 62, and a corresponding number of power electronic systems is provided in that case. This results in a high level of redundancy, but also in a large weight and high cost. In different embodiments of the invention, a modular motor 14 or, more generally, a modular electrical machine 15 is developed, wherein the motor 14 or the machine 15 either has several phases—i.e. several phases or motor modules are wound onto the same core—or several motors that are combined on a single shaft 60 are provided as motor modules M1, ..., Mn. Such a configuration is advantageous particularly where the failure probability of mechanical components, such as shafts 60, or of mechanical propulsion devices, such as propellers 62, is low, but where a higher failure probability is provided for the electric motor or its control unit.

In particular, in the electrical drive system 10 proposed herein, modules of power inverters 18.1, ..., 18.n are proposed that are connected in series.

Furthermore, a redundancy on the part of the energy sources is also provided by creating a modular energy source 12 that provides individual modules in the form of several direct voltage sources S1, ..., Sn. These direct voltage sources S1, ..., Sn can be, for example, solar panels 80 or other devices for converting solar energy or radiation energy into electrical energy, batteries or rechargeable batteries or fuel cells or the like. Today, solar cells or fuel cells are problematic in that the manner in which they release energy may fluctuate. In the case of a fuel cell, for example, the reaction partners may not be available quickly enough, so that no constant power output over time is achieved. Therefore, a battery management system for balancing or adjusting the powers of the individual direct voltage sources is generally required in the systems known so far. In the configuration of the invention, this is done cleverly.

With the overall configuration of the electrical drive system in the design described, the power of the modular energy source 12 that is available in each case can be maximized even in the event of an irregularly operating fuel cell or partial shading of the solar cells or the like. In particular, this is done by adapting the operating point to the respective energy source. It is possible to maximize the power if the impedances are adapted accordingly. Accordingly, it is possible to compensate corresponding fluctuations in the modular energy source 12 by the arrangement of the matrix-shaped inverters and corresponding control of the power inverters by means of the power inverter control devices 24.1, ..., 24.n. Thus, the overall power is also significantly higher than the power that can be achieved in another configuration, for example that of FIG. 3. If, in the configuration of FIG. 3, a fuel cell releases only 50% of its power and is directly coupled to the corresponding motor, the motor would also output only 50% of its power. But if both the energy source and the power inverters are connected in series and if the compensating circuit 30 with a corresponding control unit is provided, then only a relatively small proportion of the overall power is lost if one of the direct voltage sources drops to 50% of its usual power.

In the exemplary embodiments shown, machine control units MCU are shown which substantially form inverters or the power electronic system for an associated electrical machine module 16.1. All of these machine control units have, in some form, an intermediate circuit capacitor 26.1, ..., 26.n at which a certain voltage V forms that is acquired with a direct voltage measuring device 20.1, ..., 20.n. Furthermore, there are compensating lines 31 that have current measuring devices 38. Current measuring devices—in this case referred to as power inverter current measuring devices 22.1, ..., 22.n—are also provided in the individual machine control units. If the current that all inverters take up is now the same everywhere, no current passes the compensating line or the compensating lines 31. If the direct voltage sources S1, ..., Sn are sources with different powers that have fluctuations in their power, then these individual voltage sources can be subjected to different loads by having differential current flow through the compensating lines 31.

The corresponding control or regulating devices can be implemented in a decentralized manner in control units—in particular in the power inverter control devices e.g. as software—or accommodated in a central control unit (not shown). The power inverter control device 24.1, ..., 24.n can be implemented in the individual MCU1, ..., MCUn or in a central control unit, which is not shown and which is correspondingly connected to the power inverters 18.1, ..., 18.n.

A so-called multiphase motor may be provided as a modular motor 14 or, generally, as a modular electrical machine 15. For example, a common polyphase motor has a phase system with three phases. Given a modular motor 14 with n=2, two such three-phase systems would be provided, all of which are wound onto the same core. Thus, a redundancy would be electrically realized, by winding several phase systems onto the same core.

In the embodiment indicated in FIG. 5, several electric motors operate on the same shaft 60. Instead of operating on a single shaft 60, the different motors can also be combined in a transmission.

The electrical drive system 10 can be used for the propulsion of aircraft. In one variation, the electrical drive system can be used as a starter and/or as a generator—starter/generator 74—for the engines 76, which may otherwise also be configured in a conventional manner. In another variation, the electrical drive system 10 may be used for driving an air conditioning system.

There is a growing trend in research towards more and more motive power in an aircraft 70—such as ancillary drives—being realized electrically. The electrical drive system 10 may also be used for such ancillary drives. Another application is, for example, the drive of a hydraulic pump. So far, several hydraulic pumps are in each case provided on aircraft 70 in order to meet the requirements of redundancy. Instead of providing several hydraulic pumps, a single pump could be driven by the electrical drive system 10 according to one embodiment of the invention. In this case, the failure probability of the mechanical components of the pump may also be much lower than that of the motor regions; accordingly, considerable weight can also be saved here.

The different exemplary embodiments respectively show machines with star-connected phases. However, the ideas described herein are not limited to this. They also work with machines with a delta connection, for example. Given more than three phases, other connections or mixed forms are also possible.

In the case of applications as starters or generators, both functions by means of the same machine are also possible.

LIST OF REFERENCE NUMERALS

10 Electrical drive system
12 Modular source of energy
14 Modular motor
15 Modular electrical machine
16.1 First electrical machine module
16.2 Second electrical machine module
16.$n$ Further electrical machine module
18.1 First power inverter
18.2 Second power inverter
18.$n$ Further power inverter
20.1 First direct voltage measuring device
20.2 Second direct voltage measuring device
20.$n$ Further direct voltage measuring device
22.1 First power inverter current measuring device
22.2 Second power inverter current measuring device
22.$n$ Further power inverter current measuring device
24.1 First power inverter control device
24.2 Second power inverter control device
24.$n$ Further power inverter control device
26.1 First capacitor
26.2 Second capacitor
26.$n$ Further capacitor
30 Compensating circuit
31 Compensating line
31.1 First connecting line
31.$n$-1 Further connecting line
32 Power inverter center tap
32.1 First power inverter center tap
32.$n$-1 Further power inverter center tap
33 Voltage source center tap
33.1 First voltage source center tap
33.$n$-1 Further voltage source center tap
34 Communication device
36 Overall direct voltage measuring device
38 Current measuring device (compensating line)
40 Supply line
42 Voltage source switching device
44 Bridging device
46 Circuit breaker
48 Diode
50 Compensating line switching device
52 Circuit breaker
60 Shaft
60.1 First shaft
60.$n$ Further shaft
62 Propeller
62.1 First mechanical propulsion device
62.$n$ Further mechanical propulsion device
70 Aircraft
72 Propulsion system
74 Starter
76 Engine
78 Wing
80 Solar panel
A Power inverter direct voltage current
A1 Compensating current
A2 Compensating current
S1 First direct voltage source
S2 Second direct voltage source
Sn Further direct voltage source
M1 First motor module
M2 Second motor module
Mn Further motor module
MCU1 First machine control unit
MCU2 Second machine control unit
MCUn Further machine control unit
V Power inverter direct voltage
Vs Overall direct voltage While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical drive system for an aircraft, comprising:
    at least one first and one second electrical direct voltage source for supplying a direct voltage,
    a first electrical machine module and a second electrical machine module, the electrical machine modules being configured to convert electrical alternating voltage into mechanical movement and/or to convert mechanical movement into electrical alternating voltage, the first electrical machine module being connected to a first power inverter and the second electrical machine module being connected to a second power inverter, the first and second power inverters being connected in series and the first and the second direct voltage sources being connected in series to generate an overall direct voltage to which the series-connected power inverters are connected, the power inverters each having one voltage measuring device for measuring the power inverter direct voltage present at the respective power inverter and a power inverter control device for controlling the operation of the power inverters in accordance with the power inverter direct voltage, a compensating line being provided between a voltage source center tap between the first and second voltage sources and a power inverter center tap between the first and second power inverters, and the first and second power inverter control devices being connected to each other communicatively by a communication device to exchange at least one piece of information about the measured power inverter direct voltages in real time; and a compensating current measuring device for measuring the compensating current flowing through the compensating line, wherein a piece of information about the measured compensating current is configured to be transmitted via the communication device to at least one of the power inverter control devices.

2. The electrical drive system according to claim 1, wherein at least one of the power inverters has a power inverter current measuring device for measuring the power inverter direct voltage current flowing through the power inverter, wherein a piece of information about the measured power inverter direct voltage current can be transmitted in real time via the communication device.

3. The electrical drive system according to claim 1, wherein the first and/or the second power inverter is implemented in a machine control unit.

4. The electrical drive system according to claim 1, wherein the first and second power inverter control devices are configured for compensating and/or adjusting the powers between the first and second direct voltage sources.

5. The electrical drive system according to claim 1, further comprising at least one of:
   at least one or several further direct voltage sources connected in series with the first and second direct voltage sources to generate the overall direct voltage, and/or
   at least one or several further electrical machine modules with one further power inverter each, the further power inverter(s) being connected in series with the first and second power inverters and also having a further power inverter direct voltage measuring device and a further power inverter control device that are connected to the communication device.

6. The electrical drive system according to claim 1, wherein the first and/or the second direct voltage source is provided with a voltage source switching device for switching off a terminal of the direct voltage source and with a bridging device for bridging the switched-off direct voltage source.

7. The electrical drive system according to claim 1, wherein the compensating line is provided with a compensating line switching device with which the compensating line can be interrupted or connected.

8. The electrical drive system according to claim 1, wherein the electrical machine modules are motor modules for driving a propulsion for an aircraft and/or for driving ancillary components of an aircraft.

9. The electrical drive system according to claim 1, wherein the first and second direct voltage sources are selected from the group of direct voltage sources consisting of a battery, a battery pack, a rechargeable battery, a rechargeable battery pack, a fuel cell, a fuel cell array, a solar cell and a solar cell pack.

10. A method for operating an electrical drive system according to claim 1, comprising:
    compensating and/or adjusting the power distribution between the first and second direct voltage sources by the power inverter control devices.

11. An aircraft comprising an electrical drive system comprising:
    at least one first and one second electrical direct voltage source for supplying a direct voltage,
    a first electrical machine module and a second electrical machine module, the electrical machine modules being configured to convert electrical alternating voltage into mechanical movement and/or to convert mechanical movement into electrical alternating voltage, the first electrical machine module being connected to a first power inverter and the second electrical machine module being connected to a second power inverter, the first and second power inverters being connected in series and the first and the second direct voltage sources being connected in series to generate an overall direct voltage to which the series-connected power inverters are connected, the power inverters each having one voltage measuring device for measuring the power inverter direct voltage present at the respective power inverter and a power inverter control device for controlling the operation of the power inverters in accordance with the power inverter direct voltage, a compensating line being provided between a voltage source center tap between the first and second voltage sources and a power inverter center tap between the first and second power inverters, and the first and second power inverter control devices being connected to each other communicatively by a communication device to exchange at least one piece of information about the measured power inverter direct voltages in real time; and
    a compensating current measuring device for measuring the compensating current flowing through the compensating line, wherein a piece of information about the measured compensating current can be transmitted via the communication device to at least one of the power inverter control devices.

* * * * *